United States Patent
Ll et al.

(10) Patent No.: US 8,482,183 B2
(45) Date of Patent: Jul. 9, 2013

(54) TEST SUBSTRATE AND METHOD FOR MEASURING CONTACT FORCE

(75) Inventors: Li Ll, Beijing (CN); Zhilong Peng, Beijing (CN); Wei Wang, Beijing (CN)

(73) Assignee: Beijing BOE Optoelectronics Technology Co., Ltd., Beijing (CN)

(*) Notice: Subject to any disclaimer, the term of this patent is extended or adjusted under 35 U.S.C. 154(b) by 182 days.

(21) Appl. No.: 12/878,158

(22) Filed: Sep. 9, 2010

(65) Prior Publication Data

US 2011/0062822 A1    Mar. 17, 2011

(30) Foreign Application Priority Data

Sep. 11, 2009 (CN) .......................... 2009 1 0092941

(51) Int. Cl.
*H01L 41/08* (2006.01)

(52) U.S. Cl.
USPC ............ 310/311; 310/317; 310/319; 310/367

(58) Field of Classification Search
USPC ................. 310/317, 328, 330–332, 339, 365, 310/800, 311
See application file for complete search history.

(56) References Cited

U.S. PATENT DOCUMENTS

| | | | | |
|---|---|---|---|---|
| 3,568,124 A * | 3/1971 | Sonderegger | ...................... | 338/4 |
| 3,662,234 A * | 5/1972 | Ishii | .............................. | 257/417 |
| 4,555,953 A * | 12/1985 | Dario et al. | .............. | 73/862.046 |
| 4,618,397 A * | 10/1986 | Shimizu et al. | ................. | 438/53 |
| 4,657,775 A * | 4/1987 | Shioiri et al. | ................. | 427/578 |
| 4,835,747 A * | 5/1989 | Billet | ............................. | 367/164 |
| 5,336,959 A * | 8/1994 | Park et al. | ...................... | 310/328 |
| 5,760,530 A * | 6/1998 | Kolesar | .......................... | 310/339 |
| 6,148,662 A * | 11/2000 | Lin | ................................ | 73/105 |
| 6,252,334 B1 * | 6/2001 | Nye et al. | ...................... | 310/328 |
| 6,485,380 B2 * | 11/2002 | Spangler et al. | .............. | 473/521 |
| 6,603,242 B2 * | 8/2003 | Lee et al. | ...................... | 310/365 |
| 6,771,083 B1 * | 8/2004 | Habermehl | .................... | 324/727 |
| 6,782,755 B2 * | 8/2004 | Tai et al. | ......................... | 73/754 |
| 6,995,496 B1 * | 2/2006 | Hagood et al. | ................. | 310/317 |
| 7,982,375 B2 * | 7/2011 | Tan et al. | ...................... | 310/338 |
| 2004/0046484 A1 * | 3/2004 | Schiller | ......................... | 310/317 |
| 2008/0269614 A1 * | 10/2008 | Adachi et al. | ................. | 600/459 |
| 2009/0309616 A1 * | 12/2009 | Klinghult et al. | ............. | 324/686 |
| 2010/0063749 A1 * | 3/2010 | Kurtz et al. | ..................... | 702/24 |

FOREIGN PATENT DOCUMENTS

| | | |
|---|---|---|
| CN | 2600801 Y | 1/2004 |
| CN | 201051025 Y | 4/2008 |

OTHER PUBLICATIONS

Fourth Chinese Office Action dated Mar. 15, 2013; Appln. No. 200910092941.1.

* cited by examiner

*Primary Examiner* — Mark Budd
(74) *Attorney, Agent, or Firm* — Ladas & Parry LLP

(57) ABSTRACT

A test substrate for measuring contact force and a method for measuring contact force are provided in the technology. The substrate may comprises: a base substrate, and a piezoelectric element provided on a surface of the base substrate. One end of the piezoelectric portion is a detecting voltage input terminal and the other end thereof is a detecting voltage output terminal. According to the technology, the substrate and method for measuring contact force can be used to measure the contact force applied to the substrate by the cleaning apparatus or conveying apparatus, and thus the contact force can be properly controlled and the adverse influence on the substrate from the conveying apparatus or cleaning apparatus can be decreased or eliminated.

13 Claims, 2 Drawing Sheets

TEST SUBSTRATE AND METHOD FOR MEASURING CONTACT FORCE

BACKGROUND

Embodiments of the present technology relate to a test substrate for measuring contact force and a method for measuring contact force.

During manufacturing thin film transistor liquid crystal display (TFT-LCD) or semiconductor device, it is always necessary to clean or convey the substrate for the TFT-LCD or semiconductor device, and thus a large number of conveying apparatuses and cleaning apparatuses are present in a production line. These apparatuses directly contact the TFT-LCD or semiconductor device. When the contact force applied to the substrate by the apparatus is excessive, the substrate may suffer damages.

For example, brush cleaning is a typical process for cleaning an array substrate of TFT-LCD. During the process, brushes are provided on both upper and lower sides of the substrate. If a press-in amount (contact amount) of the brushes is excessively large, a large contact force is applied to the substrate by the brush. Thus, the properties of the array substrate might be adversely affected, for example, defects such as deformation or residuals and the like might occur, and the substrate might even be crushed. At present, the press-in amount of the brush is manually adjusted, thus it is difficult to accurately control the press-in amount of the brushes and accordingly it is difficult to avoid the adverse influence on array substrate from the brush. In addition, it is difficult to control the contact force applied to the substrate by the conveying or cleaning apparatuses and in turn it is difficult to avoid the adverse influence on the devices disposed on the substrate.

BRIEF DESCRIPTION OF THE DRAWINGS

The present technology will become more fully understood from the detailed description given hereinafter and the accompanying drawings which are given by way of illustration only, and thus are not limitative of the present technology and wherein.

DESCRIPTION OF THE EMBODIMENTS

Hereinafter, the embodiments of the technology will be described in detail with reference to the accompanying drawings.

According to the technology, a test substrate for measuring contact force is provided. The substrate for measuring contact force may comprise a piezoelectric element and a base substrate. The piezoelectric element is provided on the base substrate. One end of the piezoelectric element is an input terminal of detecting voltage, and the other end thereof is an output terminal of detecting voltage. When the test substrate for measuring contact force make contact with a conveying apparatus or cleaning apparatus, the test substrate can measure the contact force applied to the substrate. In this way, the contact force applied to the substrate by the conveying or cleaning apparatus can be accurately controlled and the adverse influence on the substrate from the conveying or cleaning apparatus can be decreased or eliminated.

Figure 1:
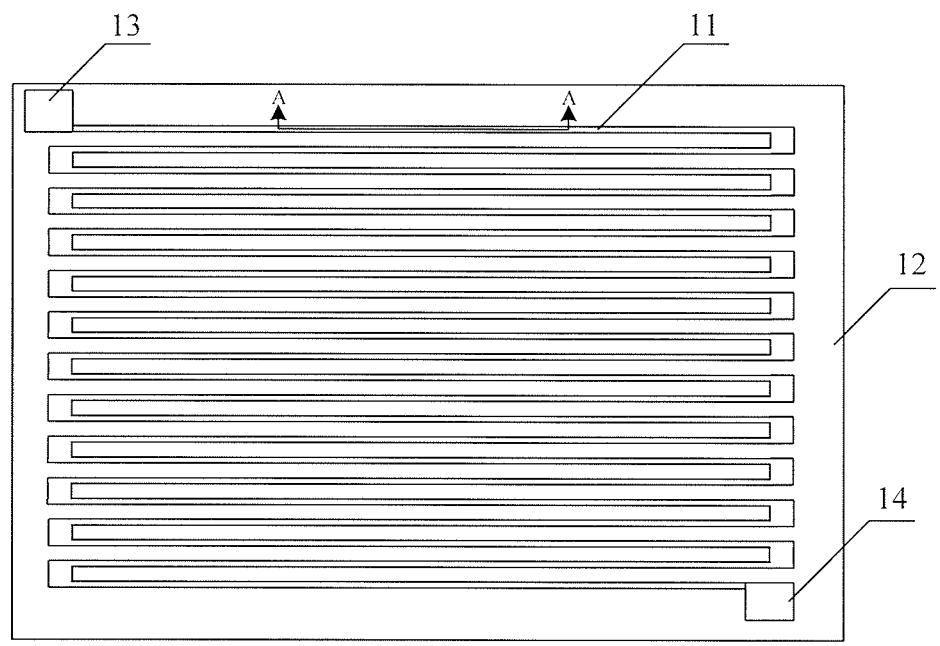
FIG. 1 is a schematic top view showing a test substrate for measuring contact force according to a first embodiment of the technology.

FIG. 1 is a schematic top view showing a test substrate for measuring contact force according to a first embodiment of the technology. As shown in FIG. 1, the test substrate for measuring contact force in this embodiment comprises a piezoelectric element 11 and a base substrate 12. The piezoelectric element 11 is provided on the base substrate 12. One end of the piezoelectric element 11 is an input terminal of detecting voltage 13, and the other end thereof is an output terminal of detecting voltage 14. In this embodiment, the piezoelectric element 11 is formed in a zigzag shape and uniformly distributed on the surface of the base substrate 12. As shown in FIG. 1, the longitudinal direction of the piezoelectric element 11 is parallel to the longitudinal direction of the base substrate 12. However, the longitudinal direction of the piezoelectric element 11 may also be parallel to the transverse direction of the base substrate 12 or the piezoelectric element 11 may be oriented in other manners. In addition, a plurality of zigzag piezoelectric elements 11 may be provided, and each the piezoelectric element 11 has the input terminal of detecting voltage and output terminal of detecting voltage.

Figure 2:
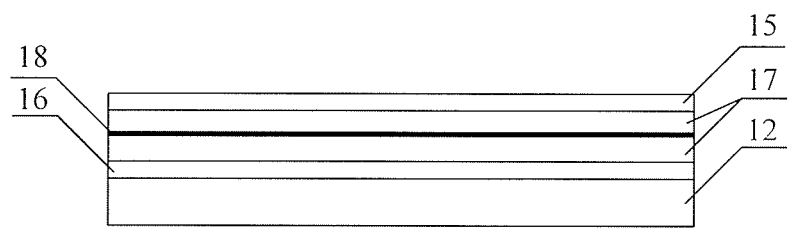
FIG. 2 is a sectional view taken along line A-A in FIG. 1.

FIG. 2 is a sectional view taken along line A-A in FIG. 1. As shown in FIG. 2, the piezoelectric element 11 comprises an upper force transmission element 15, a lower force transmission element 16, two piezoelectric layers 17 provided between the upper force transmission element 15 and the lower force transmission element 16, and an electrode layer between the two piezoelectric layers 17. The piezoelectric layer 17 may be formed by quartz or organic piezoelectric materials with high piezoelectric coefficient and high sensitivity. The upper force transmission element 15 and the lower force transmission element 16 may be formed by wear-resistant and corrosion-resistant metal materials, such as steel.

The thickness of each of the upper force transmission element 15 and the lower force transmission element 16 may be in the range from 0.05 nm to 0.5 nm. When an external force is applied on the upper force transmission element 15 and the lower force transmission element 16, the upper force transmission element 15 and the lower force transmission element 16 can be elastically deformed and transfer the external force to the piezoelectric layer 17. In this embodiment, compared with the piezoelectric layer 17, the upper force transmission element 15 and the lower force transmission element 16 can be more easily deformed. Thus, by providing the upper force transmission element 15 and the lower force transmission element 16, the deformation of the test substrate might be amplified, and thus the measurement sensitivity can be improved. In addition, the upper force transmission element 15 and the lower force transmission element 16 may comprise metal materials such as steel with a small thickness so as to obtain required deformation. In addition, the upper force transmission element 15 and the lower force transmission element 16 may comprise corrosion-resistant metal materials so that the test substrate for measuring contact force can be used in corrosive environments such as etching chamber and the like. In addition, the upper force transmission element 15 and the lower force transmission element 16 may comprise wear-resistant metal material so as to reduce or prevent the abrasion of the substrate. In addition, the piezoelectric layer 17 may be directly provided on the base substrate 12 without providing the upper force transmission element 15 and the lower force transmission element 16.

In this embodiment, the piezoelectric layer 17 might comprise XY cut quartz with a piezoelectric coefficient $d_{11}$, for example, utilizing longitudinal piezoelectric effect of the quartz. That is, the voltage difference across the input terminal and output terminal of the piezoelectric element is changed when the substrate is deformed by the contact force. In addition, considering the size of the glass substrates employed in the fifth-generation production line, the length of each of the two quartz layers may be in the range from 1000 mm to 1050 mm, and the thickness of each of the two quartz layers may be in the range from 0.4 mm to 1 mm. In addition, in this embodiment, the magnitude of the contact force measured by the quartz may be in the range from 0.4 N to 1700 N, and the minimum resolution is 0.01 N.

The base substrate 12 may comprise quartz, resin, glass or flexible materials. In addition, the length and thickness of the two piezoelectric layers may be designed according to the requirements.

The electrode 18 can be optionally disposed between the two piezoelectric layers so as to increase the mobility of carriers in the piezoelectric layers and increase current and voltage of the piezoelectric element, thus the measurement sensitivity can be further improved. It should be noted that, the electrode 18 may also be omitted.

In this embodiment, the input value of the detecting voltage is in the range from 10V to 50 V.

In addition, the detecting voltage input terminal of the piezoelectric element may be connected to a preamplifier in order to increase the input detecting voltage. The preamplifier may be a charge amplifier or a voltage amplifier.

Specifically, a detecting voltage is firstly amplified by the preamplifier, the amplified detecting voltage is then applied to the piezoelectric element, and the contact force is measured according to input detecting voltage and output detecting voltage of the piezoelectric element.

In this embodiment, the input detecting voltage is amplified by the preamplifier, thus the output detecting voltage is also in the amplified state and accordingly the variation between the output detecting voltage and the input detecting voltage is amplified as well. In this way, the measurement precision for the contact force can be further improved.

Hereinafter, the present technology can be further explained by way of example of employing the above test substrate for measuring contact force in a brush-cleaning process.

Before the brush-cleaning process, the detecting voltage is input to the piezoelectric element 11 via the input terminal 13 and output via the output terminal 14. Since there is a small voltage drop on the piezoelectric element 11, the output detecting voltage is slightly smaller than the input detecting voltage.

During the brush-cleaning process, the brush is pressed against both upper and lower sides of the test substrate, thus the contact force is applied to the test substrate for measuring contact force by the brushes. The upper force transmission element 15 and the lower force transmission element 16 transfer the contact force to the piezoelectric layers 17, the piezoelectric layers 7 is deformed and the resistance between the input terminal 13 and the output terminal 14 is changed. Thus, the detecting voltage output by the output terminal 14 is changed as well.

Then, the output detecting voltage is processed by a digital circuit and a temperature compensating circuit so as to obtain the value of the contact force between the brush and the test substrate. The value of the contact force is related to the press-in amount of the brush. For example, for a standard brush, the press-in amount is in the range from 0.2 mm to 0.7 mm, and accordingly the pressure is in the range from 0.1 Pa to $10^3$ Pa. Thus, the press-in amount of the brush can be determined based on the value of the contact force.

In addition, in this embodiment, when the test substrate for measuring contact force is cleaned by the brush, the cleaning direction of the brush is perpendicular to the piezoelectric element, and thus the contact force at any position of the substrate can be measured. If the contact force at a certain position is abnormal (larger or smaller), the abnormal value can be corrected according to the values at other positions so that comprehensive and accurate measurement results can be obtained.

In addition, the test substrate for measuring contact force in this embodiment is not limited to be applied to the brush cleaning apparatus, and it can also be applied to any conveying apparatuses that make contact with the substrate, such as a conveying apparatus in a rubbing process or a conveying apparatus in a process of attaching a polarization film to a module.

Figure 3:
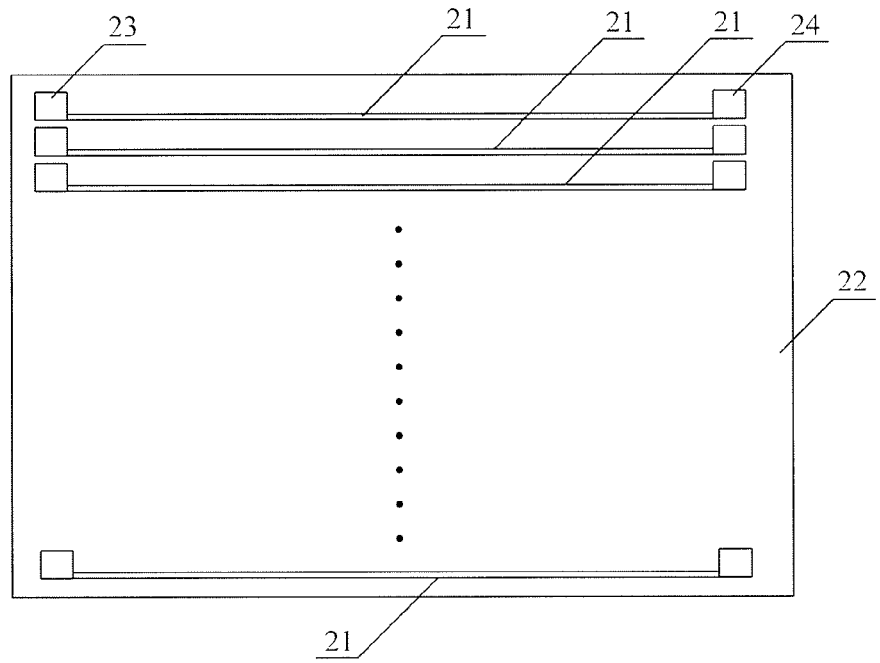
FIG. 3 is a schematic top view showing a test substrate for measuring contact force according to a second embodiment of the technology.

According to this embodiment, the test substrate for measuring contact force can be used to measure the contact force applied to the substrate by the cleaning apparatus or conveying apparatus, and thus the contact force can be properly controlled and the adverse influence on the substrate from the conveying apparatus or cleaning apparatus can be decreased or eliminated. For example, in the brush-cleaning process, the contact force applied to the substrate by the brushes can be measured by the test substrate for measuring contact force, thus the press-in amount of the brush can be determined, and in this way, the press-in amount of the brush can be properly controlled and the adverse influence on the substrate from the brush can be decreased or eliminated.

a schematic top view showing a test substrate for measuring contact force according to a second embodiment of the technology. As shown in FIG. 3, the test substrate for measuring contact force comprises a plurality of piezoelectric elements 21 and the base substrate 22. The piezoelectric elements 21 are provided on the base substrate 22. One end of each piezoelectric element 21 is connected to the input terminal 23 and the other end the piezoelectric element 21 is connected to the output terminal 24. In this embodiment, the plurality of piezoelectric elements 21 are parallel to each other and uniformly distributed on the surface of the base substrate 22.

The sectional structure and parameters of the piezoelectric element 21 in this embodiment are similar to those in the first embodiment, and the details thereof are omitted here.

In the second embodiment, a plurality of input terminals and a plurality of output terminals are provided. Thus, compared with the first embodiment, the resistance between the input terminal and output terminal of each piezoelectric element is decreased and therefore the detecting voltage can be reduced.

In addition, in the second embodiment, when the test substrate for measuring contact force is cleaned by the brush, the cleaning direction of the brush is perpendicular to the piezoelectric element, and thus the contact force applied by the brush at any position of the test substrate can be measured. If the contact force value at a certain position is abnormal (larger or smaller), the abnormal value can be corrected according to the values at other positions so that comprehensive and accurate measurement results can be obtained.

In addition, the test substrate for measuring contact force in this embodiment is not limited to be applied to the brush cleaning apparatus, and it can be also applied to any conveying apparatuses that make contact with the substrate, such as the conveying apparatus in the rubbing process or the conveying apparatus in the process of attaching the polarization film to the module.

According to this embodiment, the test substrate for measuring contact force can be used to measure the contact force applied to the substrate by the cleaning apparatus or conveying apparatus, and thus the contact force can be properly controlled and the adverse influence on the substrate from the conveying apparatus or cleaning apparatus can be decreased or eliminated. For example, in the brush-cleaning process, the contact force applied to the substrate by the brushes can be measured by the test substrate for measuring contact force, thus the press-in amount of the brush can be determined, and in this way, the press-in amount of the brush can be properly controlled and the adverse influence on the substrate from the brush can be decreased or eliminated.

Figure 4:
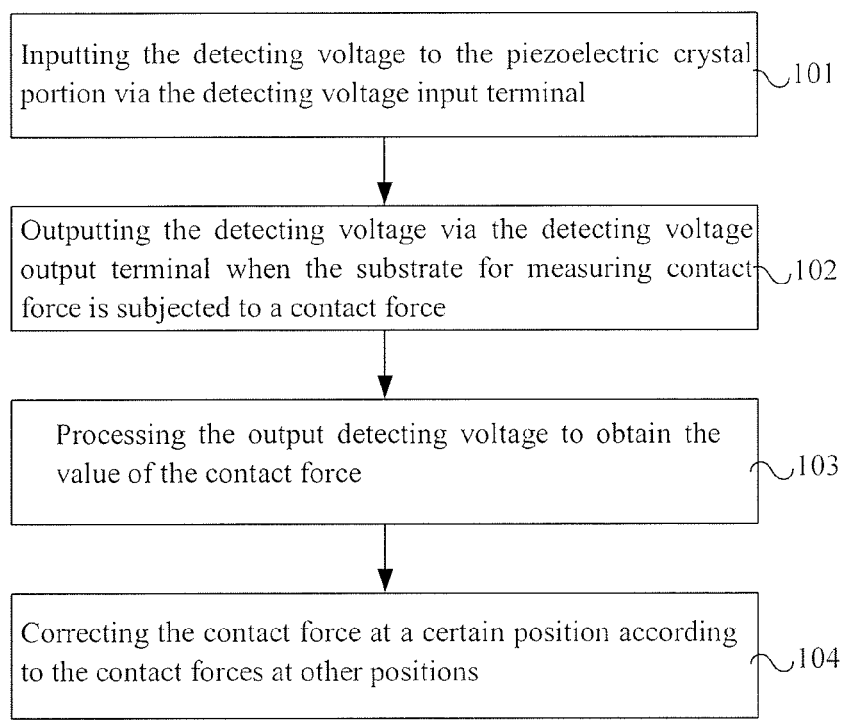
FIG. 4 is a flow chart of a method for measuring contact force according to the technology.

FIG. 4 is a flow chart of a method for measuring contact force according to the technology. As shown in FIG. 4, the method in this embodiment comprises the following steps:

Step 101 of inputting the detecting voltage to the piezoelectric element via the detecting voltage input terminal;

Step 102 of outputting the detecting voltage via the detecting voltage output terminal when the substrate for measuring contact force is subjected to the contact force; and Step 103 of processing the output detecting voltage to obtain the value of the contact force.

In step 103, specifically, the output detecting voltage is processed by a digital circuit and a temperature compensating circuit in order to obtain the value of the contact force.

In addition, in step 3, the contact forces at a plurality of positions on the substrate can be obtained. In this case, the method in this embodiment may further comprise a step 104 of correcting the contact force at a certain position according to the contact forces at other positions.

Hereinafter, the present technology can be further explained by way of example of employing the above method in a brush-cleaning process.

In step 101, before the brush-cleaning process, the detecting voltage is input to the piezoelectric element via the input terminal. At this time, if the detecting voltage is output via the output terminal, the output detecting voltage is slightly smaller than the input detecting voltage due to the voltage drop on the piezoelectric element.

In step 102, during the brush-cleaning process, the brushes are set on both upper and lower sides of the substrate, and at this time, the contact force is applied to the test substrate for measuring contact force by the brushes and the detecting voltage is output by the output terminal. The upper force transmission element and the lower force transmission element transfer the contact force to the piezoelectric layers, then the piezoelectric layers are deformed and the resistance between the input terminal and the output terminal is changed due to the piezoelectric effect. Thus, the detecting voltage output by the output terminal 14 is changed as well.

In step 103, the output detecting voltage is processed by a digital circuit and a temperature compensating circuit to obtain the value of the contact force applied by brush to the test substrate for measuring contact force. The value of the contact force is related to the press-in amount of the brush. For example, for a standard brush, the press-in amount is in the range from 0.2 mm to 0.7 mm, and accordingly the pressure is in the range from 0.1 Pa to $10^3$ Pa. Thus, the press-in amount of the brush can be determined based on the value of the contact force.

In step 104, when the test substrate for measuring contact force is cleaned by the brushes, the cleaning direction of the brushes is perpendicular to the piezoelectric element, and thus the contact force applied by the brush at any position of the substrate can be measured. If the contact force value at a certain position is abnormal (larger or smaller), the abnormal value can be corrected according to the values at other positions so that comprehensive and accurate measurement results can be obtained. In addition, if the contact value at certain position is abnormal, it might suggest there is some irregularities in the cleaning apparatus or convey apparatus. Therefore, in this embodiment, the measurement results are helpful to detect the irregularities in the cleaning apparatus or convey apparatus.

According to this embodiment, the method for measuring contact force can be used to measure the contact force applied to the test substrate by the cleaning apparatus or conveying apparatus, and thus the contact force can be properly controlled and the adverse influence on the substrate from the conveying apparatus or cleaning apparatus can be decreased or eliminated.

It should be understood that, the steps in the above method may be entirely or partially implemented by hardware according to a set of commands or instructions coded in a computer program. The programs may be stored in a readable storage medium of a computer. The above steps are implemented when the programs are executed. The readable storage medium comprises ROM, RAM, magnetic disk, optical disk or other mediums capable of storing the program.

It should be appreciated that the embodiments described above are intended to illustrate but not limit the present technology. Although the present technology has been described in detail herein with reference to the preferred embodiments, it should be understood by those skilled in the art that the present technology can be modified and some of the technical features can be equivalently substituted without departing from the spirit and scope of the present technology.

What is claimed is:

1. A test substrate for measuring contact force, comprising:
a base substrate, and
at least one piezoresistive element provided on a surface of the base substrate, wherein one end of the piezoresistive element is a detecting voltage input terminal and the other end of the piezoresistive element is a detecting voltage output terminal, wherein the piezoresistive element comprises an upper force transmission element, a lower force transmission element, at least one piezoresistive layer provided between the upper force transmission element and the lower force transmission element, the lower force transmission element contacts the base substrate.

2. The test substrate according to claim 1, wherein only one piezoresistive element is provided, and the piezoresistive element is formed in zigzag shape and uniformly distributed on the surface of the base substrate.

3. The test substrate according to claim 1, wherein a plurality of piezoresistive elements are provided, and each piezoresistive element is formed in a straight line shape, and the plurality of piezoresistive elements are parallel to each other and uniformly distributed on the surface of the base substrate.

4. The test substrate according to claim 1, wherein two piezoresistive layers are provided, and the piezoresistive element further comprises an electrode layer provided between the two piezoresistive layers.

5. The test substrate according to claim 1, wherein the upper force transmission element and the lower force transmission element comprise wear-resistant and corrosion-resistant metal materials.

6. The test substrate according to claim 1, wherein the thickness of each of the upper force transmission element and the lower force transmission element is in the range from 0.05 nm to 0.5 nm.

7. The test substrate according to claim 4, wherein the thickness of each of the two piezoresistive layers may be in the range from 0.4 mm to 1 mm.

8. The test substrate according to claim 1, wherein the input value of the detecting voltage is in the range from 10V to 50 V.

9. The substrate for measuring contact force according to claim 1, wherein a preamplifier is connected to the detecting voltage input terminal of the piezoresistive element to amplify the input detecting voltage.

10. The substrate for measuring contact force according to claim 9, wherein the preamplifier is a charge amplifier or a voltage amplifier.

11. A method for measuring contact force by using the substrate in claim 1, comprising:
inputting the detecting voltage to the piezoresistive element via the detecting voltage input terminal;
outputting the detecting voltage by the detecting voltage output terminal when the test substrate for measuring contact force is subjected to a contact force applied by an apparatus;
processing the output detecting voltage to obtain the value of the contact force,
wherein in the step of processing the output detecting voltage to obtain the value of the contact force, the output detecting voltage is processed by a digital circuit and a temperature compensating circuit to obtain the value of the contact force.

12. The method according to claim 11, wherein in the step of processing the output detecting voltage to obtain the value of the contact force, the contact force values at a plurality of positions on the substrate are obtained, and the method further comprises a step of correcting the contact force value at a certain position according to the contact force values at other positions.

13. The method according to claim 11, wherein in the step of processing the output detecting voltage to obtain the value of the contact force, the contact force values at a plurality of positions on the substrate are obtained, and the method further comprises following steps:
comparing the contact force values at the plurality of positions; and
if there is a position with abnormal contact force value, then correcting the apparatus according to the position with abnormal contact force value.

* * * * *